Sept. 9, 1969  S. ABRAHAMSSON  3,466,438
X-RAY GONIOMETERS HAVING A FILM CARRIER WHICH AUTOMATICALLY
TRANSLATES RELATIVE TO A FIXED X-RAY SOURCE
AND A ROTATING CRYSTAL SUPPORT
Filed March 11, 1968
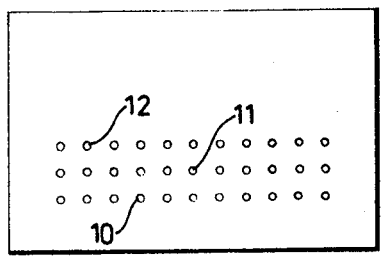
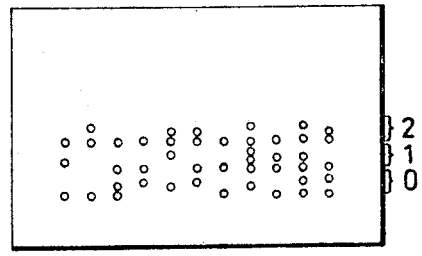
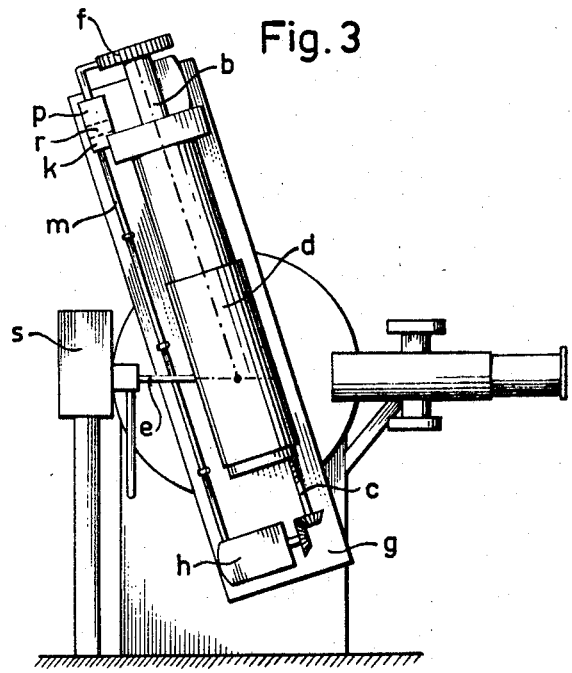
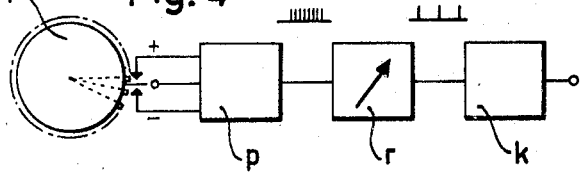

United States Patent Office 3,466,438
Patented Sept. 9, 1969

3,466,438
X-RAY GONIOMETERS HAVING A FILM CARRIER WHICH AUTOMATICALLY TRANSLATES RELATIVE TO A FIXED X-RAY SOURCE AND A ROTATING CRYSTAL SUPPORT
Sixten Abrahamsson, Goteborg, Sweden, assignor to Incentive Research and Development AB, Bromma, Sweden, a corporation of Sweden
Filed Mar. 11, 1968, Ser. No. 711,984
Claims priority, application Sweden, Mar. 13, 1967, 3,470/67
Int. Cl. H01j 37/20; G01n 23/20
U.S. Cl. 250—51.5                                1 Claim

ABSTRACT OF THE DISCLOSURE

A radiation source is provided, and a rotatable crystal support supports a crystal in a path of radiation from said source. A photographic film container is displaceable by drive means relative to the radiation source and the crystal support. Rotation of the crystal support produces electrical pulses in an electrical circuit. A suppression circuit provides predetermined suppression of some of the pulses of said electrical circuit and is adjustable to vary the number of suppressed pulses to match the crystal structure. The output of the suppression circuit is connected to the drive means which displaces the film container.

---

The present invention relates to X-ray goniometers to be used for the determination of crystal structures and, more particularly, it relates to such an instrument of the type comprising on the one hand a rotatable support for a crystal which, during the examination thereof, is exposed to radiation from a radiation source and, on the other, a photographic film container adapted to carry out a translatory movement relative to the radiation source and the crystal support.

Among the existing methods for determining crystal structures those based on X-ray diffraction are predominant. In order to accomplish a complete analysis it is necessary to apply the so-called single crystal technique involving examination of one crystal only which is well ordered. The diffraction pattern is generally recorded on a photographic film which is later on examined and interpreted, either visually or automatically.

Accordingly, a diffraction pattern is obtained by rotation (oscillation) of the crystal in the path of the X-ray beam, the generated reflections being recorded on the film surrounding the crystal. In order to ensure that all possible reflections are obtained it is necessary to rotate the crystal through 180°. It might, however, happen that hereby several reflections coincide in the diffraction pattern which cannot be tolerated in view of the subsequent interpretation thereof. Two methods for avoiding such disadvantageous coincidence are previously known. According to the first one the maximum angle of crystal rotation, within which coincidence of reflections cannot occur, is calculated whereupon separate films are recorded for each of the corresponding necessary oscillation intervals. As is readily understood, this calls for a third operation, viz. composition of those partial reproductions into a complete one.

The second method, the so-called Weissenberg technique, implies that the layer lines are successively examined one at a time, the remaining lines being masked and the film being rotated through 180° synchronously with the crystal rotation. Also in this case there will be several reproductions for each crystal structure entailing the just-mentioned complications in respect to the interpretation. The main object of this invention is to provide a goniometer in which those disadvantages and limitations have been eliminated. According to the characteristics of the invention the crystal support is arranged so that, during the rotation thereof, there are in an electrical circuit generated equidistant pulses, a pulse suppression circuit being connected to the output of said electrical circuit for predetermined suppresion of some of said pulses in order to form a second series of equidistant pulses having a greater interspacing, said suppression circuit being adjustable for variation of the number of successive suppressed pulses to match the characteristics of the crystal structure to be examined, and said suppression circuit being for controlling purposes connected to a drive unit creating the translatory movement of said film container whereby the complete diffraction pattern of a crystal can be recorded with a minimum of disturbing overlapping reflections.

The invention will now be described in greater detail, reference being made to the accompanying drawing, in which:

FIG. 1 shows a diffraction pattern comprising coinciding reflections.

FIG. 2 shows a pattern obtained by means of a goniometer designed according to the present invention.

FIG. 3 illustrates diagrammatically a goniometer designed in accordance with this invention.

FIG. 4 is a block circuit diagram corresponding to a portion of the device illustrated in FIG. 3.

The dots in FIG. 1 correspond to reflections of the kind generated when a crystal is, in the beam from an X-ray source, rotated through 180°. However, that picture does not accurately represent the crystal pattern because some of the dots are multiples, i.e. they have been generated in response to more than one reflection. The bottom dot row corresponds to layer line 0, the intermediate one to layer line 1, and the top row to layer line 2. Dot 10 in layer line 0 represents two coinciding (superimposed) reflections, dot 11 in line 1 three, and dot 12 in line 2 two coinciding reflections.

FIG. 2 shows a reproduction obtained by use of the subject of this invention. There are no coinciding dots and the interpretation of the reproduction does not call for any combination of partial reproductions.

The device shown in FIG. 3 comprises a radiation source $s$, a rotatable support $b$ and a photographic film container $d$. The radiation emitted by source $s$ passes through a collimator $e$ towards the crystal under examination which is mounted inside film container $d$. The support $b$ is together with container $d$ carried by a frame $g$ which can be inclined relative to radiation source $s$ in such a manner that the radiation does, at all inclinations, remain directed towards the crystal mounted at the end of support $b$. Film container $d$ is longitudinally displaceable by means of a threaded rod $c$.

At the outer end of support $b$ there is a cam wheel $f$ which during the rotation of the support does, at constant angular intervals, supply electrical pulses to an electrical circuit $p$. The output of circuit $p$ is connected to a pulse suppression circuit $r$ which suppresses certain predetermined pulses thus generating a transformed series of equidistant pulses having a greater interspacing. The number of suppressed successive pulses is variable to match the individual nature of the crystal to be examined. Accordingly, the corresponding adjustment of the suppression circuit is made manually before initiation of a recording.

The pulses remaining after the selective suppression are fed to a step-by-step motor drive circuit $k$ controlling a motor $h$ which over a gear drives rod $c$ for step-by-step movement of film container $d$. Upon rotation of support $b$ in the one direction, e.g. clockwise, container $d$ is displaced downwards. One way of attaining that result is to make clockwise rotation to generate positive pulses in circuit $p$ and energization of motor h in the one direction, whereas counter-clockwise rotation of support b causes negative pulses to occur in circuit p and opposite energization of motor h.

FIG. 4 does diagrammatically show how cam wheel f controls a switch generating positive or negative pulses in circuit p. It does also illustrate the pulse trains at the output of circuit p and circuit r, respectively. By adjusting circuit r it is possible to increase or decrease the spacing between the successive pulses. From the output of circuit k a suitable current, or voltage, is via cable m supplied to motor h. This is also shown in FIGURE 3.

When the device above described is in operation, film container d assumes identical positions at each oscillation cycle of the crystal. The number of step-wise movements of the container during one measuring operation is dependent of the separation between the various layer lines i.e. it is individually determined for each crystal structure—cf. FIG. 1.

The requirement that the dots should be sufficiently interspaced also in a reproduction according to FIG. 2 defines a lower limit for the translatory movement of the film container. By way of example, the corresponding movement could be of the order of 40 mils, or 1 mm., if the zones are separated by e.g. 120 mils, or 3 mm., it is feasible to operate with a three-step displacement only which theoretically corresponds to rotational intervals of $3 \times 60°$. In practice, $3 \times 65°$ generally has to be selected. An increase of the number of intervals yields a corresponding reduction of the risk of overlapping. When carrying out registration of the complete diffraction pattern by means of step-by-step displacements of film container d, it is thus not necessary to mask the zones. However, it is also possible to use the goniometer as an ordinary oscillation camera or with zone masking as a usual Weissenberg camera.

What I claim is:
1. An X-ray goniometer for determining crystal structures wherein the complete diffraction pattern of a crystal can be recorded with a minimum of disturbing overlapping reflections, said goniometer comprising a radiation source, a crystal support for supporting a crystal to be examined, means mounting said support for rotation, a photographic film container, means mounting said container for displacement relative to said radiation source and said crystal support, drive means for displacing said film container, an electrical circuit, means operatively connected with said crystal support for generating equidistant electrical pulses in said electrical circuit upon rotation of said support, a pulse suppression circuit connected with the output of said electrical circuit for predetermined suppression of some of said pulses to form a second series of equidistant pulses with greater inter spaces, said suppression circuit being adjustable to vary the number of suppressed successive pulses to match the characteristics of the crystal structure to be examined, said suppression circuit being connected to and controlling the operation of said drive means.

References Cited
UNITED STATES PATENTS 3,340,396   9/1967   Prickett et al. _____ 250—51.5

RALPH G. NILSON, Primary Examiner

C. E. CHURCH, Assistant Examiner

U.S. Cl. X.R.

250—52